United States Patent
Shieh et al.

(10) Patent No.: US 10,913,069 B2
(45) Date of Patent: Feb. 9, 2021

(54) METHOD AND DEVICE FOR POLYMERASE CHAIN REACTION

(71) Applicant: NATIONAL CHENG KUNG UNIVERSITY, Tainan (TW)

(72) Inventors: Dar-Bin Shieh, Tainan (TW); Chih-Chia Huang, Tainan (TW); Chen-Min Chang, Tainan (TW); Tsung-Ju Li, Tainan (TW); Po-Yang Chang, Tainan (TW); Ming-Chi Hsieh, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 31 days.

(21) Appl. No.: 16/244,133

(22) Filed: Jan. 10, 2019

(65) Prior Publication Data
US 2019/0143334 A1    May 16, 2019

Related U.S. Application Data

(62) Division of application No. 14/840,833, filed on Aug. 31, 2015, now Pat. No. 10,213,785.

(60) Provisional application No. 62/044,413, filed on Sep. 2, 2014.

(51) Int. Cl.
  *B01L 7/00*    (2006.01)
  *C01G 49/08*   (2006.01)
  *B01L 9/06*    (2006.01)

(52) U.S. Cl.
  CPC .............. *B01L 7/52* (2013.01); *C01G 49/08* (2013.01); *B01L 9/06* (2013.01); *B01L 2200/0647* (2013.01); *B01L 2200/147* (2013.01); *B01L 2300/023* (2013.01); *B01L 2300/027* (2013.01); *B01L 2300/1844* (2013.01); *B01L 2300/1861* (2013.01); *C01P 2004/62* (2013.01); *C01P 2004/64* (2013.01); *C01P 2006/32* (2013.01)

(58) Field of Classification Search
None
See application file for complete search history.

(56) References Cited

U.S. PATENT DOCUMENTS

2007/0243523 A1* 10/2007 Ionescu-Zanetti ................ G01N 15/1475
                                                                   435/4
2008/0176289 A1*  7/2008 Zeng ..................... G06T 7/11
                                                                   435/91.2

FOREIGN PATENT DOCUMENTS

CN      1470873 A    1/2014
WO   2012158631 A3   1/2013

OTHER PUBLICATIONS

Zimmer et al., "Shrinking the apparatus size for DNA-analysis," Proc. SPIE, Mar. 16, vol. 4236, pp. 58-65. (Year: 2001).*

* cited by examiner

*Primary Examiner* — Young J Kim
(74) *Attorney, Agent, or Firm* — ScienBiziP, P.C.

(57) ABSTRACT

An apparatus for amplifying a nucleic acid sequence in a polymerase chain reaction (PCR) is provided. The apparatus comprises a microprocessor configured to communicatively couple with a user input device and receive instructions from the user input device and implement the received instructions; an electromagnetic radiation (EMR) generator configured to generated EMR at frequencies ranging from 300 THz to 400 THz and communicatively coupled with the microprocessor; a reaction vessel, communicatively coupled with the microprocessor, to house the nucleic acid sequence, necessary reagents to the PCR, and particles comprising a transition metal material, and to receive the EMR generated by the EMR generator; and a temperature sensor communicatively coupled with the reaction vessel and the microprocessor.

9 Claims, 10 Drawing Sheets

METHOD AND DEVICE FOR POLYMERASE CHAIN REACTION

CROSS-REFERENCE TO RELATED APPLICATIONS

This application is a division of U.S. non-provisional patent application Ser. No. 14/840,833, filed on Aug. 31, 2015, which claims the benefit of U.S. provisional patent application No. 62/044,413, filed on Sep. 2, 2014, the entirety of which are incorporated herein by reference.

FIELD

The present disclosure relates to amplifying nucleic acid sequences by polymerase chain reaction (PCR). More particularly, the present disclosure relates to amplifying nucleic acid sequences in PCR by use of electromagnetic radiation (EMR) in combination with EMR frequency absorbing particles having a transition metal material as a heating source.

BACKGROUND

Polymerase chain reaction (PCR) is a technique discovered to synthesize multiple copies of one or more fragments of DNA from a single or multiple target templates. The original PCR process is based on heat stable DNA polymerase enzyme from *Thermus aquaticus* (Taq), which can synthesize a complimentary strand of a given DNA strand in a mixture containing the four types of DNA bases (cytosine, guanine, adenine, and thymine) and a pair of DNA primers, each primer at a terminus of the target DNA sequence. The mixture is heated to separate the double helix DNA into individual strands containing the target DNA sequence and then cooled to allow the primers to hybridize with their complimentary sequences on the separate strands and the Taq polymerase to extend the primers into new complimentary strands. Repeated heating and cooling cycles multiply the target DNA exponentially, for each newly formed double helix separates to become two templates for further synthesis.

A typical temperature profile for the polymerase chain reaction includes, (1) denaturation at 95° C. for 15 to 30 seconds; (2) hybridization with primers at appropriate annealing temperature for 30 to 60 seconds; and (3) elongation or extension of the hybridized primers at 72° C. for a period of time depending on the length of the DNA to be amplified, typically for about 30 to 60 seconds. The denaturation and hybridization Its steps occur almost instantly, however, in conventional PCR apparatus, the temperature changes at a rate approximately 1° C./second when a metal heating block or water is used for thermal equilibration. This conventional thermal cycle is inefficient for it requires heating and cooling of material other than the DNA sample itself.

BRIEF DESCRIPTION OF THE DRAWINGS

The present description will be better understood from the following detailed description read in light of the accompanying drawings, where.

DETAILED DESCRIPTION

Figure 1:
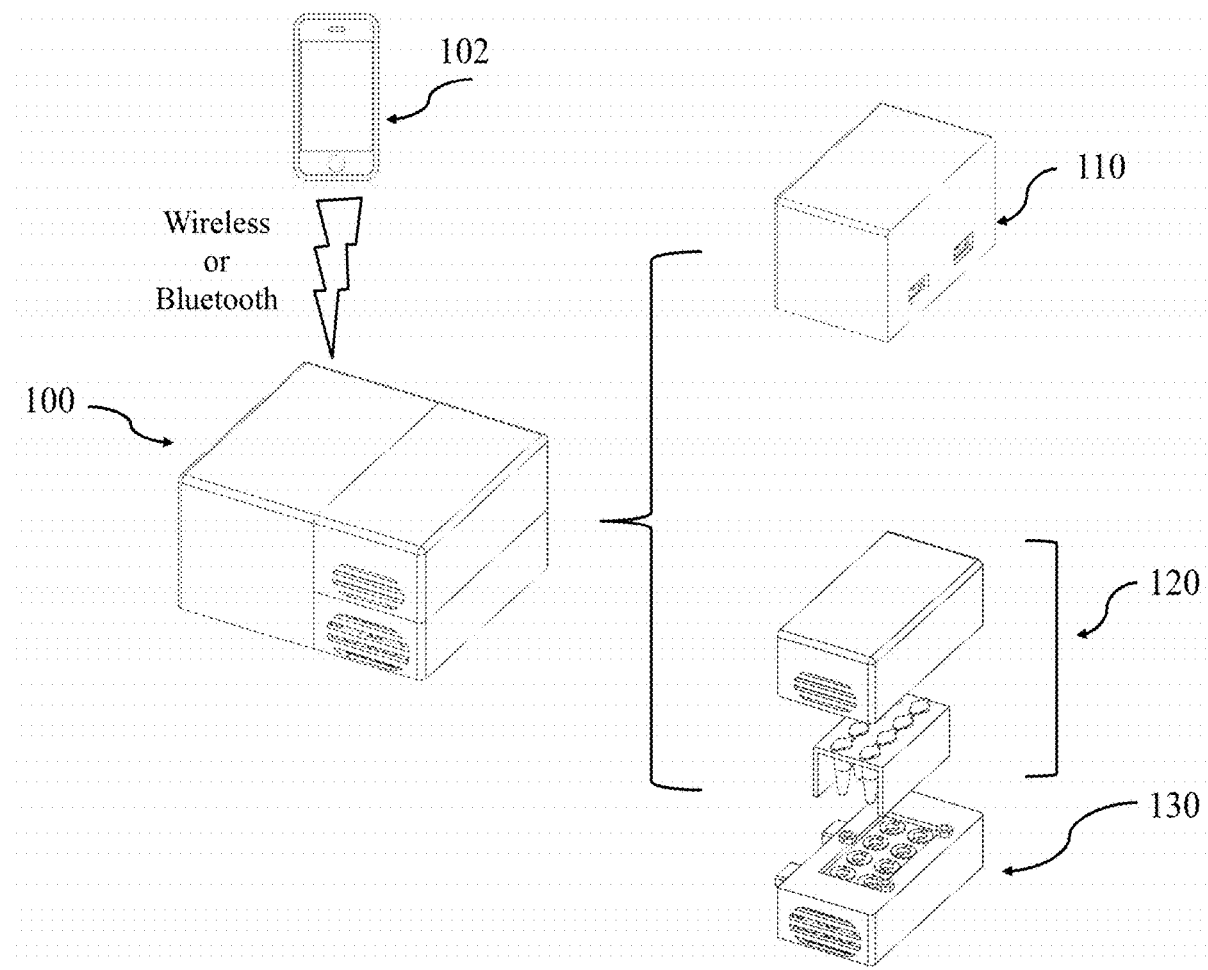
FIG. 1 is a diagram illustrating the structures of an exemplary mini PCR device and its interaction with a user device in accordance with aspects of the present disclosure.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Procedures of PCR involve a great deal of heating at controlled temperatures, which is not only tedious but also time and energy consuming. In the present disclosure, by use of electromagnetic radiation (EMR), in combination with EMR absorbing particles having a transition metal material, as the heating source, it is possible to elevate the temperature of a PCR reaction mixture at a rate of about 13-15° C./sec, thereby allowing the PCR to proceed in a much faster and more energy efficient manner in a miniature device. Further, rapid transitions from one temperature to another ensure that the sample (e.g., target DNA sequence) spends a minimum amount of time at undesirable intermediate temperatures to optimize the fidelity and purity of the amplified DNA.

The present disclosure is directed to a method for amplifying a nucleic acid sequence of a reaction mixture in a polymerase chain reaction (PCR). The method includes contacting the reaction mixture with particles formed from a material having a transition metal, a nitride, a phosphide or an arsenide of a Group III metal doped with the transition metal, or silicon dioxide doped with the transition metal. The method can further include irradiating the particles with electromagnetic radiation (EMR) having a frequency of about 200 kilohertz (kHz) to 500 terahertz (THz), such that the target nucleic acid sequence is amplified. The Group III metal can be any one of aluminum (Al), gallium (Ga), and indium (In). The transition metal can be any one of manganese (Mn), iron (Fe), cobalt (Co), and copper (Cu). The temperature of the reaction mixture in the PCR can be increased at a rate of about 13-15° C./sec and decreased at a rate of about 6-7° C./sec.

The present disclosure further is directed to a method for amplifying a nucleic acid sequence of a reaction mixture in a polymerase chain reaction (PCR). The method includes contacting the reaction mixture with particles having a material having a transition metal oxide, a transition metal hydroxide, a silicon dioxide doped with the transition metal oxide, or a silicon dioxide doped with the transition metal hydroxide. The method can further include irradiating the particles with electromagnetic radiation (EMR) having a frequency of about 200 kHz to 500 THz, such that the target nucleic acid sequence is amplified. The transition metal, the transition metal oxide or transition metal hydroxide can be composed, in whole or in part, of one of manganese (Mn), iron (Fe), cobalt (Co), and copper (Cu). The temperature of the reaction mixture in the PCR is increased at a rate of about 13-15° C./sec and decreased at a rate of about 6-7° C./sec. According to one or more embodiments of the present disclosure, the transition metal oxide or hydroxide can be any one or more of $FeO$, $Fe_2O_3$, $Fe_3O_4$, $FeO(OH)$, $Fe(OH)_2$, $Fe(OH)_3$, $MnO$, $Mn_3O_4$, $Mn_2O_3$, $MnO(OH)$, $MnO_2$, $CoO$, $CoO(OH)$, $Co_3O_4$, and $CuO$.

According to one or more embodiments, the particle can be any one or more of $FeO$, $Fe_2O_3$, or $Fe_3O_4$.

According to one or more embodiments, the nitride, phosphide or arsenide of Group III metal doped with the transition metal or metal ion includes, but is not limited to, gallium nitride (GaN) doped with Mn, Fe, Co or Cu; aluminum nitride (AlN) doped with Mn, Fe, CO or Cu, or an ion thereof aluminum phosphide (AlP) doped with Fe, Co or Cu, or an ion thereof; indium phosphide (InP) doped with Fe, Co or Cu, or an ion thereof; gallium arsenide (GaAs) doped with Fe, Co or Cu, or an ion thereof, and indium arsenide (InAs) doped with Fe, Co or Cu, or an ion thereof.

The step of irradiating the particles comprises increasing the temperature of the reaction mixture to a first temperature range required for denaturing DNA, typically about 80 to 105° C. for about 0.5 to 1 minute; increasing the temperature of the reaction mixture to a second temperature range for primer pair annealing, typically about 35 to 65° C. for about 0.5 to 1 minute so that a pair of primers hybridize with the denatured target nucleic acid sequence; and increasing the temperature of the reaction mixture to a third temperature range of polymerase activity, typically about 40 to 80° C., for about 0.5 to 5 minutes depending on the length of the target amplified sequence, so that the target nucleic acid sequence is amplified by elongation synthesis.

In some embodiments, the particles are directly mixed with the target nucleic acid in the reaction mixture, and each particle in the reaction mixture has a hydrodynamic diameter of about 100 to 800 nm.

In other embodiments, the reaction mixture is held in a vessel composed of the particles having a transition metal material. For example, in some embodiments one or more films, coatings, or layers having the particles described above, can be disposed on a surface of the vessel. The one or more films, coatings or layers can each be composed of one or more monolayers of the panicles described above.

The one or more films, coatings, or layers can be fabricated independently of the vessel and then disposed on the vessel. For example, particle-containing thin films can be formed in a matrix or carrier material can be formed and subsequently disposed onto a surface of the vessel by any one of hot, cold, or solvent lamination techniques. One of ordinary skill will recognize that any method of disposing the one or more films, coatings, or layers that results in strong adherence to the vessel surface, thereby preventing detachment or delamination from the vessel surface, is highly desirable.

The one or more films, coatings, or layers can be formed directly on the on the vessel. The one or more films, coatings, or layers can be formed directly on the on the vessel by any one of, chemical vapor deposition (CND), physical vapor deposition, spray coating, brushing, dip coating, or any other suitable method. One of ordinary skill will recognize that any method of directly forming the one or more films, coatings, or layers that results in strong adherence to the vessel surface, thereby preventing detachment or delamination from the vessel surface, is highly desirable.

Accordingly, the present disclosure also encompasses a device for amplifying a target nucleic acid sequence of a reaction mixture in a PCR. The device includes a tube or container holder, or a reaction vessel, configured to allow the reaction mixture to indirectly or directly contact the particle of the present disclosure; an EMR frequency generator configured to emit radiation having frequency of about 200 kHz to 600 THz, which is subsequently directed to the sample holder or reaction vessel for irradiating the particles; and a microprocessor coupled with the sample holder or the reaction vessel, a fan, and the EMR frequency generator, for increasing and decreasing the temperatures of the reaction mixture respectively at a rate of about 13-15° C./sec and 6-7° C./sec.

As described above, the generated EMR frequency can be in a range of 200 kHz to 600 THz. Alternatively, the generated EMR frequency can be in a range of 100 THz to 600 THz, alternatively 200 THz to 500 THz, and alternatively, 300 THz to 400 THz.

As described above, the device includes a reaction vessel for holding the reaction mixture; and a temperature sensor coupled with the vessel, to detect the temperature of the reaction mixture. The device further includes an EMR frequency generator. The device further includes a temperature control circuit for controlling the temperature sensor. Additionally, the device can include a control circuit configured to modulate the intensity of the EMR frequency generated from the EMR frequency generator. In at least one, implementation, the device can also include a microprocessor coupled with the temperature control circuit and the heat control circuit. The microprocessor can be configured to increase the temperature of the reaction mixture to a first range of about 80 to 105° C. for about 0.5 to 1 minutes to denature the target nucleic acid sequence. The microprocessor can further be configured to increase the temperature of the reaction mixture to a second temperature range of about the annealing temperature of the primers, typically in a range of 35 to 65° C. for about 0.5 to 1 minute, to hybridize a pair of DNA primers with the denatured target nucleic acid sequence. The microprocessor can be configured to increase the temperature of the reaction mixture to a third temperature range of about 40 to 80° C. for about 0.5 to 1 minute, depending on the length of the target sequence, to amplify the target nucleic acid sequence by elongation synthesis.

The device can further comprise a wireless communication circuit such as a BLUETOOTH®, a ZIGBEE® or a WIFI™ circuit for wirelessly communicating with the user input device via sending and receiving information to and from the device.

According to at least one embodiment, the device is about 300 to 500 $cm^3$ or less in size.

Accordingly, one aspect of the present disclosure is to provide a method for amplifying a target nucleic acid sequence of a reaction mixture in a PCR. The method includes contacting the reaction mixture with EMR frequency absorbing particles formed from a material that is a transition metal, a nitride, a phosphide or an arsenide of a Group III metal doped with the transition metal or a transition metal ion, or silicon dioxide doped with the transition metal. The method can further include irradiating the EMR absorbing particles with EMR having a frequency of about 200 kHz to 500 THz to amplify the target nucleic acid sequence. The Group III metal is any one of Al, Ga, and In. The transition metal is any one of Mn, Fe, Co and the transition metal ion is an ion of any one of Mn, Fe, Co and Cu. The temperatures of the reaction mixture in the PCR are raised and cooled respectively at a rate of about 13-15° C./sec and 6-7° C./sec.

Another aspect of the present disclosure is to provide a method for amplifying a target nucleic acid sequence of a reaction mixture in a PCR. The method includes contacting the reaction mixture with EMR frequency absorbing particles formed from a material that is a transition metal oxide or transition metal hydroxide, or silicon dioxide doped with the transition metal oxide or transition metal hydroxide; and irradiating the EMR absorbing particles with EMR having a frequency of about 200 kHz to 500 THz to amplify the target nucleic acid sequence. The transition metal oxide or hydroxide can comprise any one of Mn, Fe, Co and Cu. The temperatures of the reaction mixture in the PCR are raised and cooled respectively at a rate of about 13-15° C./sec and 6-7° C./sec.

In general, any particles capable of absorbing and releasing heat (e.g., originated from light or EMR frequency) to its surrounding area can be used as the heating source, in the method of the present disclosure.

The particles that are a transition metal oxide or transition metal hydroxide include, but are not limited to, FeO, $Fe_2O_3$, $Fe_3O_4$, FeO(OH), $Fe(OH)_2$, $Fe(OH)_3$, MnO, $Mn_3O_4$, $Mn_2O_3$, MnO(OH), $MnO_2$, CoO, CoO(OH), $Co_3O_4$, and CuO. In at least one example, the particles include FeO, $Fe_2O_3$, or $Fe_3O_4$.

The particles that are nitrides, phosphides or arsenides of a Group III metal doped with the transition metal or a transition metal ion include, but are not limited to, GaN doped with Mn, Fe, Co or Cu, or an ion thereof; AlN doped with Mn, Fe, Co or Cu, or an ion thereof; AlP doped with Fe, Co or Cu; MP doped with Fe, Co or Cu, or an ion thereof; GaAs doped with Fe, Co or Cu, or an ion thereof; and InAs doped with Fe, Co or Cu, or an ion thereof.

Each type of particles can have similar or unique energy conversion properties. According; to exemplary embodiments of the present disclosure, the EMR absorbing; particles are iron oxide particles selected from the group consisting of FeO, $Fe_2O_3$, and $Fe_3O_4$. In at least one example, iron oxide particles of the present disclosure exhibit strong absorption to EMR frequencies of about 300 to 400 THz, particularly at 371 THz. In another example, the iron oxide particles exhibit strong absorption to EMR having frequencies of 200 kHz to 2 MHz, particularly, at 1.3 megahertz (MHz). Due to the high heat conversion efficiency of the iron oxide particles of the present disclosure, the temperature of the particles after being irradiated with the EMR can increase at a rate of about 13-15° C./sec. In addition, the iron oxide particles also allow fast cooling when EMR is turned off, with a cooling rate of about 6-7° C./sec.

The iron oxide particles of the present disclosure can be about 10 to 1,200 nm in diameter; alternatively, about 50 to 1,000 nm in diameter; alternatively about 80 to 800 nm in diameter. In one example, two preparations of iron oxide particles respectively having different sizes are prepared.

One preparation of the iron oxide particles results in particles relatively small in size, with each particle being about 60 to 150 nm in diameter; such as 60, 70, 80, 90, 100, 110, 120, 130, 140 or 150 nm in diameter; alternatively about 80 to 120 nm in diameter, such as 80, 90, 100, 110 or 120 nm; alternatively about 100 nm in diameter. Particles within the 60 to 150 nm diameter range have been found to exhibit desired dispersion properties in solvents and resulting layers, coatings, or films having requisite magnetic properties for EMR absorption.

The second preparation of the iron oxide particles result in particles relatively large in size with each particle being about 200 to 1,200 nm in diameter; such as 200, 300, 400, 500, 600, 700, 800, 900, 1,000, 1,100 or 1,200 nm in diameter; alternatively about 400 to 1,000 nm in diameter, such as 400, 500, 600, 700, 800, 900 or 1,000 nm; alternatively about 800 nm in diameter. Particles within the 200 to 1,200 nm diameter range have been found to exhibit superior magnetic properties over the 60 to 150 nm diameter range particles with reduced dispersion in solvents.

According to embodiments of the present disclosure, the iron oxide particles of the present disclosure, either small or large in size, exhibit good energy conversion properties, with the large size iron oxide particles exhibiting the best energy conversion properties to bring the temperature of a PCR mixture to about 100° C. within 15 sec.

One approach of employing iron oxide particles as the heating source in a PCR reaction is bye directly adding a sufficient amount of the iron oxide particles to the PCR reaction mixture, and then proceed with the PCR reactions as normal.

Alternatively, the iron oxide particles of the present disclosure can be formed into a vessel, as described above, for receiving the PCR mixture directly or indirectly therein. The term "directly" as used herein refers to loading the PCR mixture into or onto the vessel formed by a material containing the iron oxide particles of the present disclosure. The term "indirectly" means the PCR mixture is loaded into a container (e.g., an Eppendorf tube) before being placed into the vessel formed by a material containing the iron oxide particles of the present disclosure. In at least one exemplary embodiment, the iron oxide particles of the present disclosure are formed into a microfluidic biochip reaction chamber, in which the PCR reaction mixture is loaded directly into the reaction chamber or coated on the reaction chamber. In another exemplary embodiment, the iron oxide particles of the present disclosure are formed into a thin film, on which various reaction spots, each containing a PCR reaction mixture are placed, and each of the PCR reactions proceed simultaneously on the film.

FIG. 1 is a diagram of an exemplary device 100 of the present disclosure for conducting PCR as described herein. In the exemplary embodiment, the device 100 is wirelessly controlled by an application program in a user input device 102 (for example, a mobile phone, laptop computer, tablet computer, or other similar device). The device 100 is about 9 cm (length)×8 cm (width)×5 cm (height) in size or less.

Figure 2:
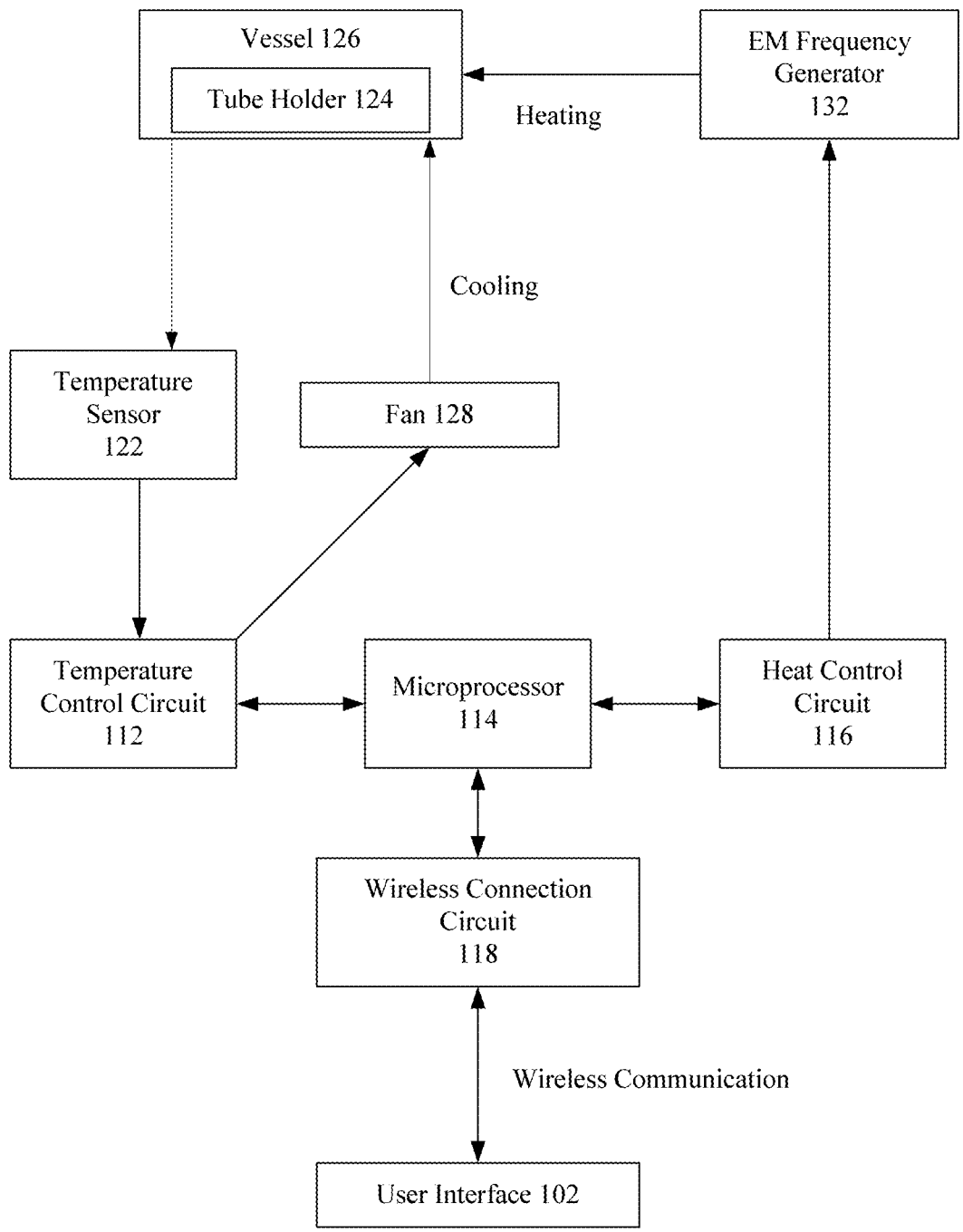
FIG. 2 is diagram illustrating an exemplary interface between the mini PCR device and the user device as depicted in FIG. 1 in accordance with aspects of the present disclosure.

FIG. 2 is diagram illustrating an exemplary interface between the mini PCR device and the user device as depicted in FIG. 1. To start to PCR procedure, the target DNA intended to be amplified, the necessary reagents (e.g., Taq, the four types of nucleotides, the DNA primer pairs, and a buffer solution and the particles of the present disclosure are loaded into a reaction tube or container (e.g., an Eppendorf tube), which is then placed into a tube or container holder 124, and the holder 124 is subsequently placed in a reaction vessel 126. Alternatively, the target DNA and the necessary reagents are loaded directly into the vessel 126, in which the vessel 126 is composed of a material comprising the particles of the present disclosure.

A PCR user can start the process by entering all the necessary parameters (for example, temperature and time of the reaction) required for running a PCR into an application program installed in a hand-held device, such as the user input device 102 exemplified as a mobile phone in FIG. 1. The information is then sent from the user input device 102 to a wireless communication circuit 118. A microprocessor 114, upon receiving the necessary parameters from the wireless communication circuit 118, then coordinates a temperature control circuit 112 and a heat control circuit 116 to execute the parameters by instructing an EMR frequency generator 132 to emit a suitable EMR frequency, and a temperature sensor 122 to initiate the requested PCR. Specifically, the EMR frequency emitted from the EMR frequency generator 132 is directed to the reaction tube or container that is held in the holder 124, or to the vessel 126, thereby raising the temperature of the PCR reaction mixture therein to the designated temperature. The EMR frequency shall match the energy conversion properties of the particles in the PCR reaction mixture held in the holder 124, or the particles contained in the reaction vessel 126. For example, in the case when iron oxide particles of the present disclosure are used, an EMR frequency of about 371 THz can be used.

Whether the PCR reaction mixture has reached its designated temperature is measured and determined by the temperature sensor 122, which is under the control of the temperature control circuit 112 via the microprocessor 114. After the PCR reaction mixture has reached the designated temperature and been held at that temperature for a designated time, the microprocessor 114 will then control the heat control circuit 116, to instruct the EMR frequency generator 132 to stop generating the EMR frequency; and the temperature sensor 122, to actuate a fan 128 to prevent the PCR mixture from over-heating or to start the cooling cycle. In other words, during the heating cycle, the microprocessor 114 coordinates the heat control circuit 116 and the temperature control circuit 112 to respectively instruct the EMR frequency generator 132 to generate EMR and the fan 128 to run or not run, depending on the desired heating rate of the PCR procedure. Similarly, during the cooling cycle, the microprocessor 114 coordinates the heat control circuit 116 and the temperature control circuit 112 to instruct the EMR frequency generator 132 to stop generating EMR and the fan 128 to run. Since the EMR frequency in combination with the particles of the present disclosure are used as the heating source, the temperature of the PCR reaction mixture can increase at a rate of about 13-15° C./sec and decrease at a rate of about 6-7° C./sec, thereby allowing the heating and cooling cycles to complete in an energy and time efficient manner.

In at least one example, amplification of 279 bps target DNA per cycle is completed in less than 60 seconds, which in general will take at least 180 seconds in a conventional PCR device.

In essence, b using an EMR frequency and EMR frequency absorbing particles, the present method and/or device significantly reduce the reaction time of a conventional PCR by at least 67%, thereby allowing the amplification of DNA fragments to be completed in a much more time and energy efficient manner, without affecting the optimum fidelity and purity of the amplified DNA product. Further, the present device is small in size, no more than 500 $cm^3$, and can be remotely activated. Thus, the present device eliminates the need of having the PCR operator to physically activate the device to start the reaction.

Without being bound to any particular theory, it presently believed that the mechanism of nanoparticle excitation may be as follows. Nanoparticles, such as, for example, iron oxide nanoparticles, can be subjected to irradiation using a radiation source having a predefined frequency. The radiation has sufficient energy to excite an electron of an iron atom in an inner orbital or shell of the atom to a higher energy unoccupied orbital or shell. This produces a metal ion with an electron missing from the inner orbital. The resulting electron configuration is unstable, and an electron from an orbital of higher energy drops into the half-filled orbital. Energy, which may be in the form of heat, is emitted as a result of the electron dropping into the half-filled orbital.

Alternatively, without being bound to any particular theory, it presently believed that the mechanism of nanoparticle excitation may be as follows. Nanoparticles, such as, for example, iron oxide nanoparticles, can be subjected to irradiation using a radiation source having a predefined frequency. The radiation can be absorbed by the atoms of the nanoparticles without ionization of said atoms. The absorbed radiation, rather, results in excitation and increased vibration of intermolecular bonds of the nanoparticles, generating heat which is released to areas surrounding the nanoparticles.

The present disclosure will now be described more specifically with reference to the following embodiments, which are provided for the purpose of demonstration rather than limitation.

EXAMPLES

Materials and Methods

PCR reaction mixture. The PCR reaction mixture contained the followings: 5 pmol of primer (SEQ ID NO: 1,5'-gcgaaagtcctggttgagctgag-3'; SEQ ID NO: 2,5'-aacccaaggcccatgcataca-3'), 1 µg template DNA, polymerase, PCR buffer, bovine serum albumin (BSA), nucleotides, and deionized water. The total volume was 20 µL.

PCR procedures. The PCR was conducted according to the following temperature profiles: (1) denaturation at 95° C. for 15 to 30 seconds; (2) hybridization with primers at 56° C. for 15 to 30 seconds; and (3) elongation or extension of the hybridized primers at 72° C. for 15 to 30 seconds.

Example 1 Preparation and Characterization of Particles 1.1 Preparation of Iron Oxide ($Fe_3O_4$) Particles Briefly, $FeCl_2$ (10 mL and 50 mM), Trimesic acid (4.5 mL and 25 mM), citrate (0.15 g), NaOH (18 mg), and $N_2H_2$ (100 µL) and gelatin were mixed and reacted at 155° C. for 12 hrs. The size and shape of the thus produced $Fe_3O_4$ nanoparticles were then determined by Transmission Electron Microscopy (TEM) and Scanning Electron Microscopy (SEM). Relatively small and large sizes $Fe_3O_4$ nanoparticles respectively having an average diameter of about 103±43 nm and about 828±559 nm were produced.

Figure 3A:
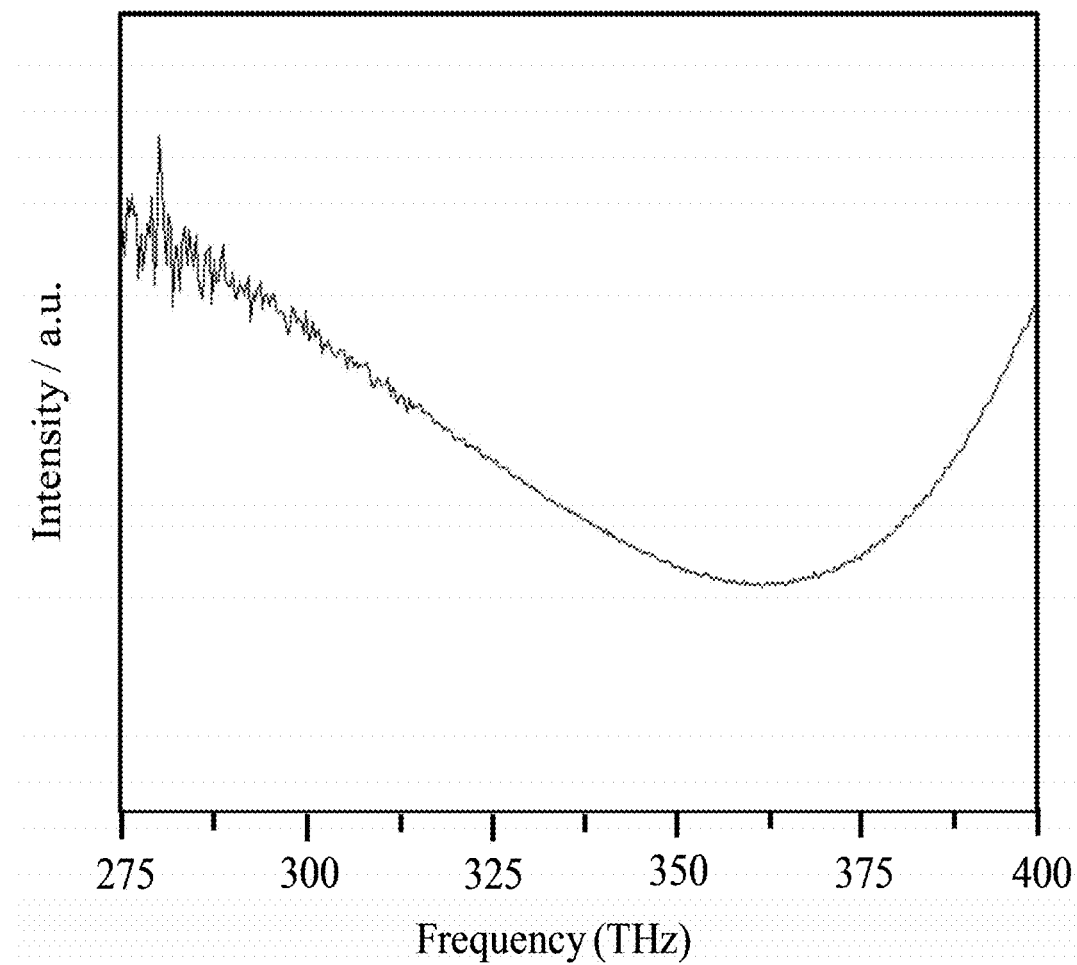
FIG. 3A illustrates the EMR frequency absorption profile of $Fe_3O_4$ nanoparticles at terahertz wavelengths in accordance with aspects of the present disclosure.

The produced $Fe_3O_4$ particles were found to absorb EMR at two different frequency ranges, one within the terahertz range (FIG. 3A, maximum absorption occurred at about 371

Figure 3B:
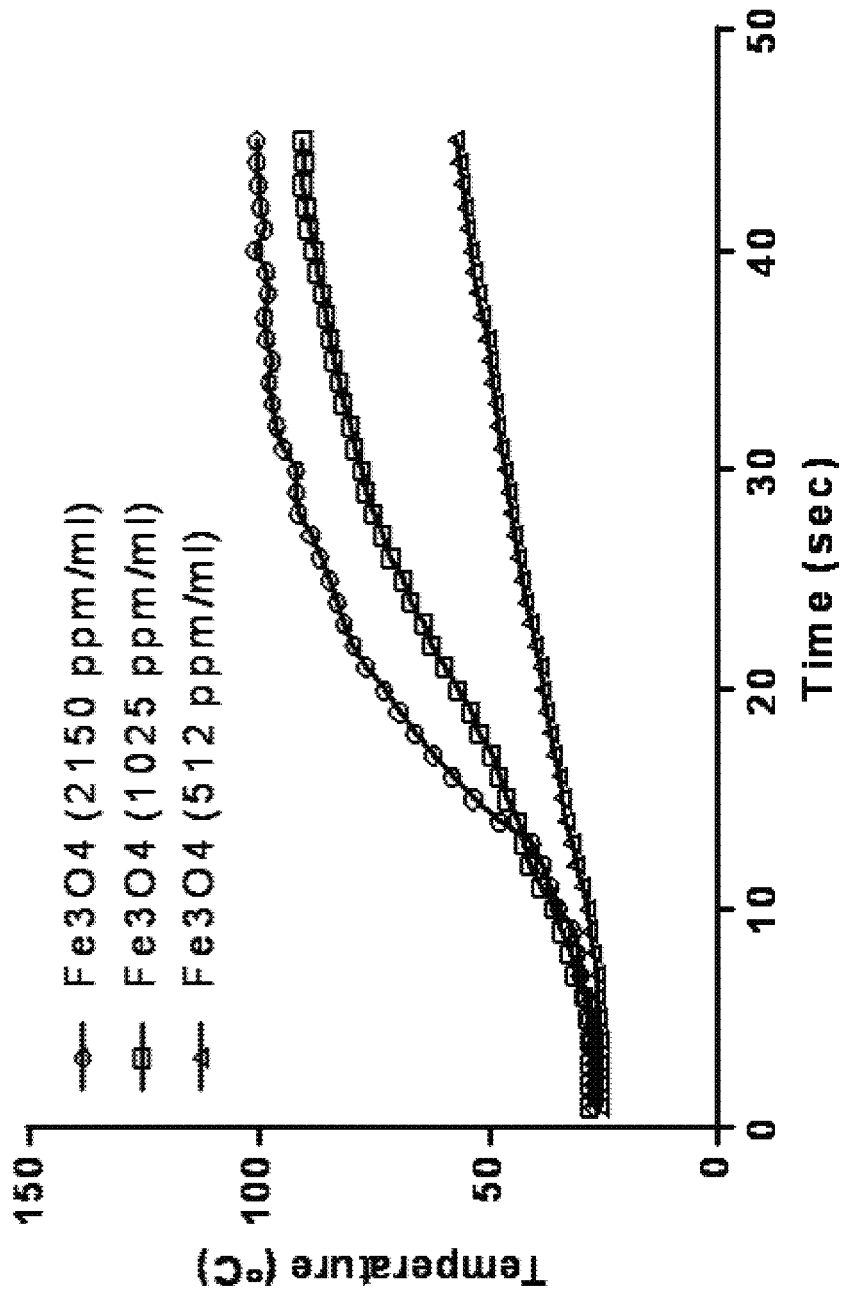
FIG. 3B illustrates the EMR frequency absorption profile of the $Fe_3O_4$ nanoparticles at 1.3 MHz in accordance with aspects of the present disclosure.
Figure 4A:
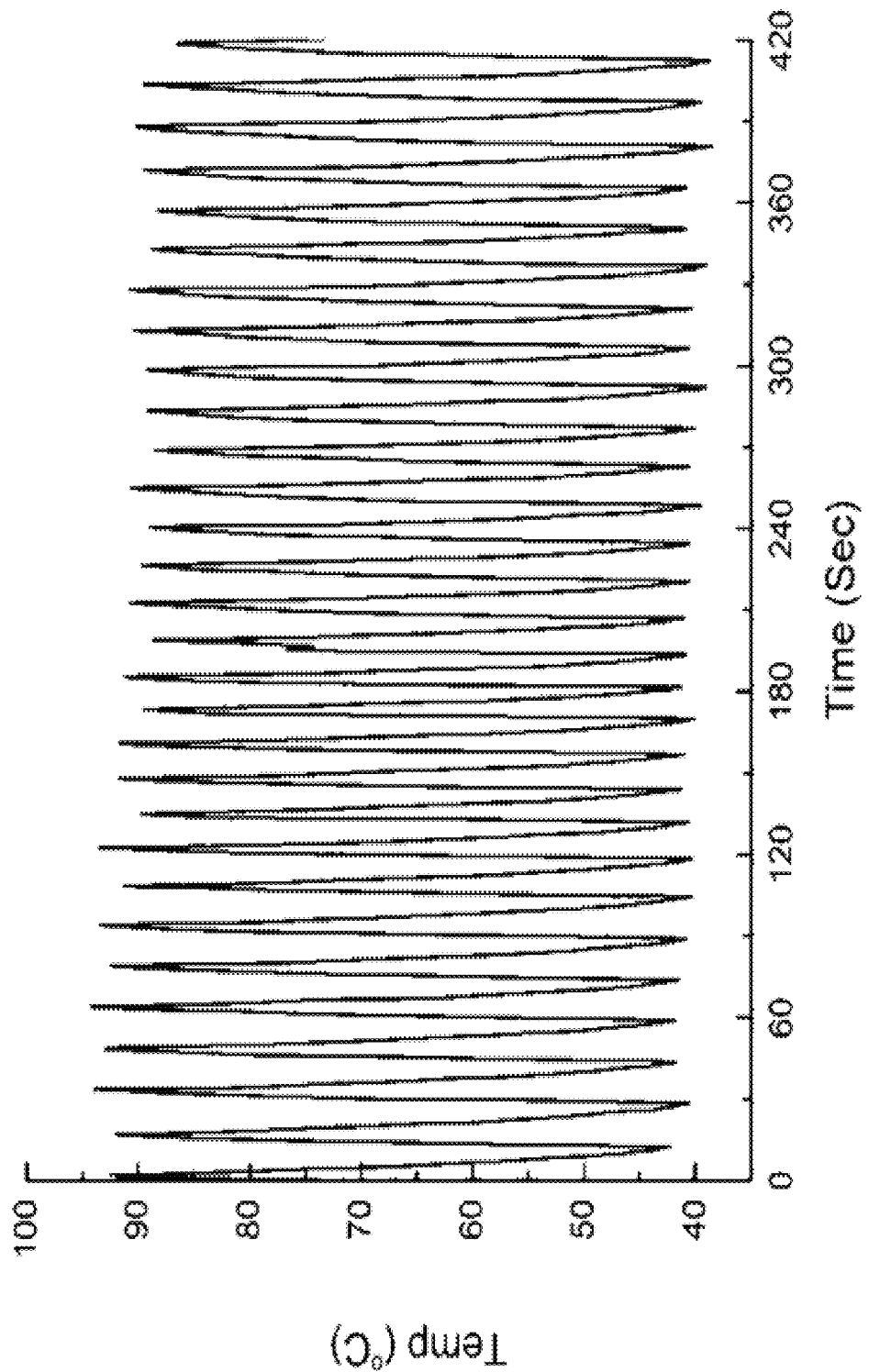
FIG. 4A is the time course of temperature changes of the particles of example 1.1 in accordance with aspects of the present disclosure.
Figure 4B:
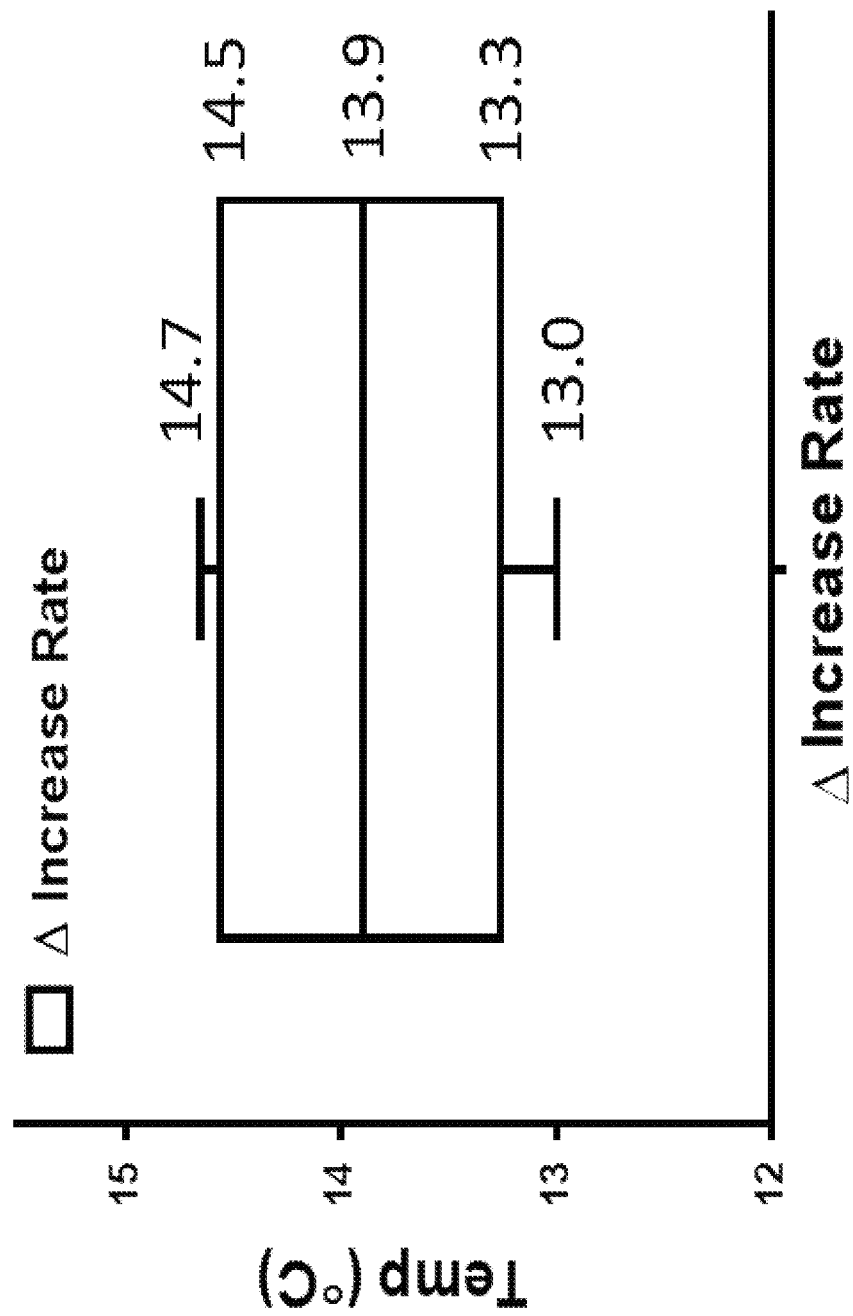
FIG. 4B illustrates the rate of increasing the temperature of the particles of example 1.1 during PCR cycle in accordance with aspects of the present disclosure.
Figure 4C:
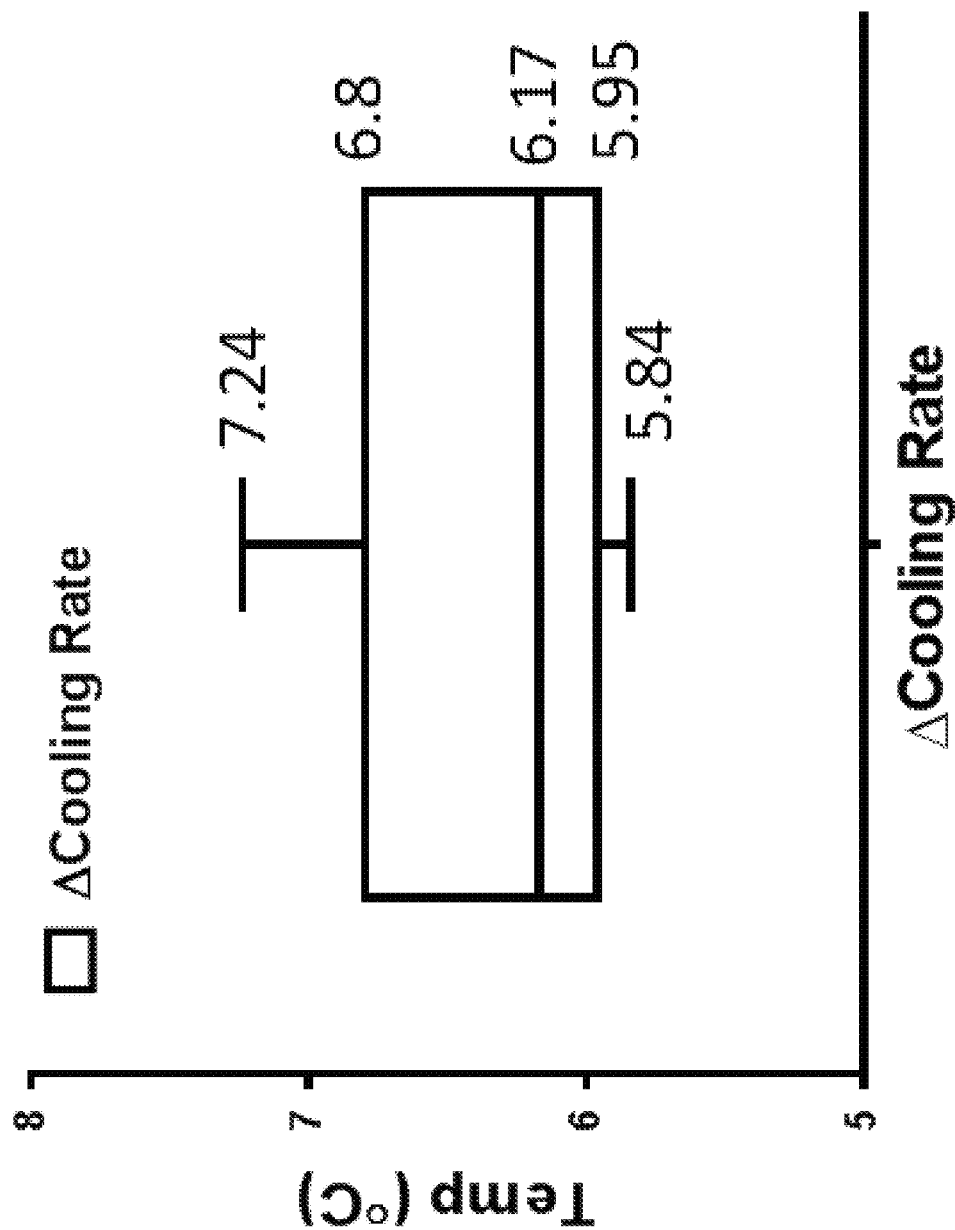
FIG. 4C illustrates the rate of decreasing the temperature of the particles of example 1.1 during PCR cycle in accordance with aspects of the present disclosure.

THz), the other within the megahertz range (FIG. 3B, 1.3 MHz). The $Fe_3O_4$ particles were then subjected to heating and cooling cycles commonly employed in PCR by irradiating the particles with EM frequency of 371 THz, the time course of temperature changes is illustrated in FIG. 4A, whereas the respective heating and cooling rates of the particles of examples 1.1 are depicted in FIGS. 4B and 4C. It was found that the particles of examples 1.1 has an average heating rate of 13.93±0.65° C./sec (FIG. 4B), and an average cooling rate of 6.39±0.50° C./sec (FIG. 4C).

With respect to the average heating rate, after multiple experiments using the same experimental parameters, it was found that the particles of example 1.1 exhibited a maximum heating rate of 14.7° C./sec, a minimum heating rate of 13.0° C./sec, a median heating rate of 13.9° C./sec, a heating rate of 13.3° C./sec in a first quartile of experiments, and a heating rate of 14.5° C./sec in a third quartile of experiments (See FIG. 4B).

With respect to the average cooling rate, after multiple experiments using the same experimental parameters, it was found that the particles of example 1.1 exhibited a maximum cooling rate of 7.24° C./sec, a minimum cooling heating rate of 5084° C./sec, a median cooling rate of 6.17° C./sec, a cooling rate of 5.95° C./sec in a first quartile of experiments, and a cooling rate of 6.80° C./sec in a third quartile of experiments (See FIG. 4C).

1.2 Preparation of Gold Nanorod Particles

The Au nanorods were produced and characterized by a method similar to example 1.1. The synthesis of Au nanorods followed a procedure similar to that described by B. Nikoobakht and M. A. El-Sayed, Chem. Mater. 2003, 15, 1957-1962. Briefly, a seed solution (12 μL) contains Hexadecyltrimethylammoniumbromide (CTAB) (5 ml, 0.20 M) and $HAuCl_4$ (5 ml, 0.0005 M) is added to 10 mL of growth solution which contains (CTAB) (5 ml, 0.20 M) and $AgNO_3$ (5 ml, 0.004 M). The reaction is kept constant at room temperature. The size of the produced Au nanorods was then determined by TEM. Each of the produced Au nanorods was about 45 nm in length, and 10 nm in width.

1.3 Characterization of the Photo-Thermal Properties of the Particles of Examples 1.1, 1.2 and Carbon Nanotubes (CNTs)

Figure 5A:
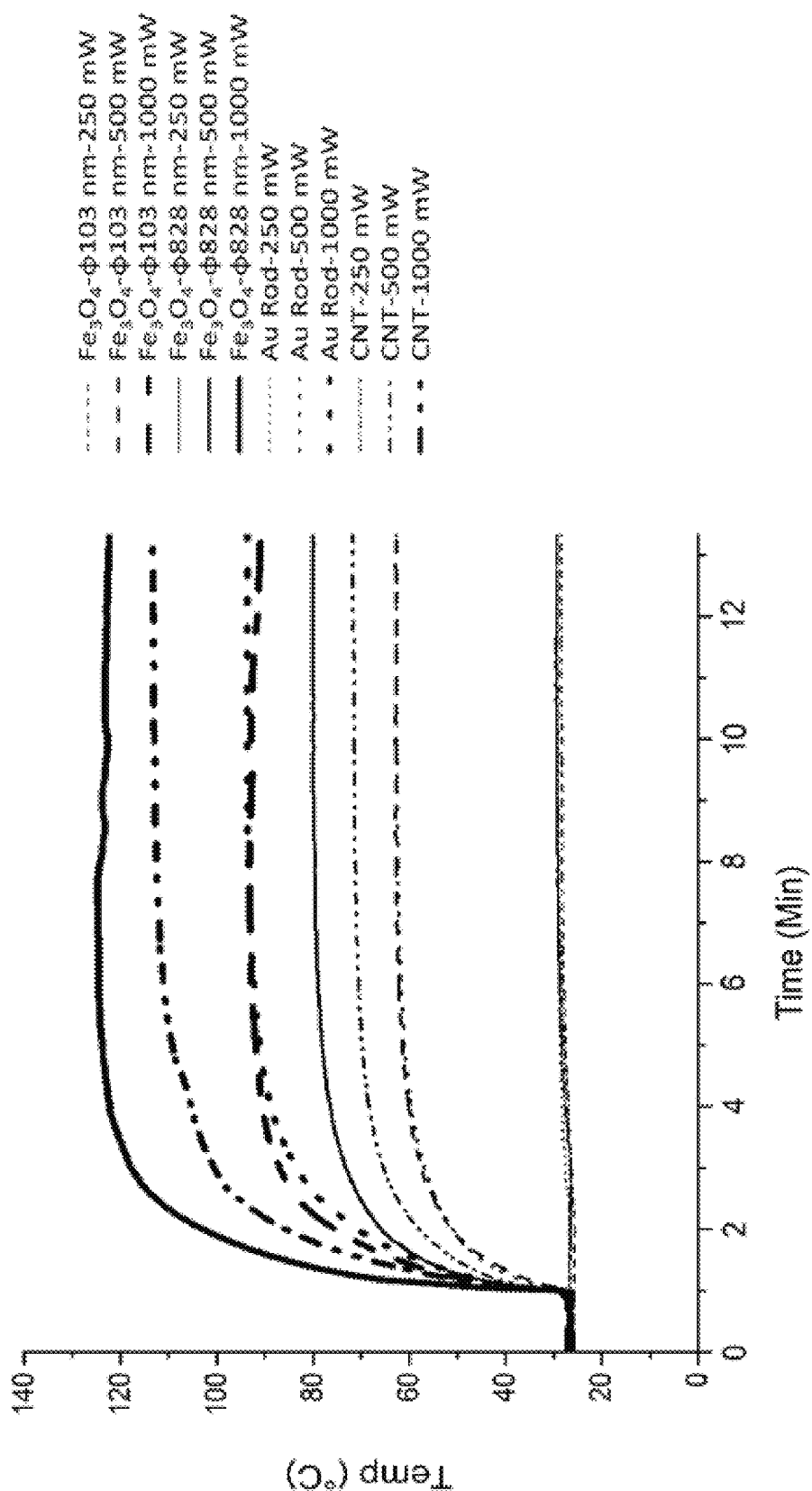
FIG. 5A illustrates the variation in temperature of various types of nanoparticles along with time, in which the concentration of the nanoparticles is 1,250 ppm in accordance with aspects of the present disclosure.

In this example, the photo-thermal properties of the particles of examples 1.1 were compared with other particles, including the gold nanorods of example 1.2 and carbon nanotubes (CNTs) (Golden Innovation Business Co., Ltd. Taiwan), by subjecting different concentrations of particles (1,250 or 2,500 ppm) to EMR emitted from 250, 500 or 1,000 milliwatt (mW) light emitting diodes (LEDs), and temperature changes over time were measured. Results are illustrated in FIGS. 5A and 5B.

It was found that the respective temperatures of $Fe_3O_4$ particles, Au nanorods and CNTs were slightly above room temperature (i.e., about 29° C.) (See FIG. 5A) upon being irradiated with an EMR frequency generator (250 mW, 371 THz). The temperatures increased to about 60° C. for small size $Fe_3O_4$ particles (ranging from about 50 nm to about 200 nm) and Au nanorods, about 65° C. for CNTs, and about 79° C. for large size $Fe_3O_4$ particles (ranging from about 250 nm to about 1400 nm) when the power of the EMR frequency generator was elevated to 500 nm. When the power was raised to 1,000 mW, then the temperature increased to about 85° C. for small size $Fe_3O_4$ nanoparticles and Au nanorods, about 110° C. for CNTs, and about 120° C. for large size $Fe_3O_4$ nanoparticles. Taken together, the temperature of each type of particles increases in proportion to the increase in the power of the EMR frequency generator; and among the three types of particles, $Fe_3O_4$ particles, particularly the large size $Fe_3O_4$ particles, exhibit the best energy conversion properties.

Figure 5B:
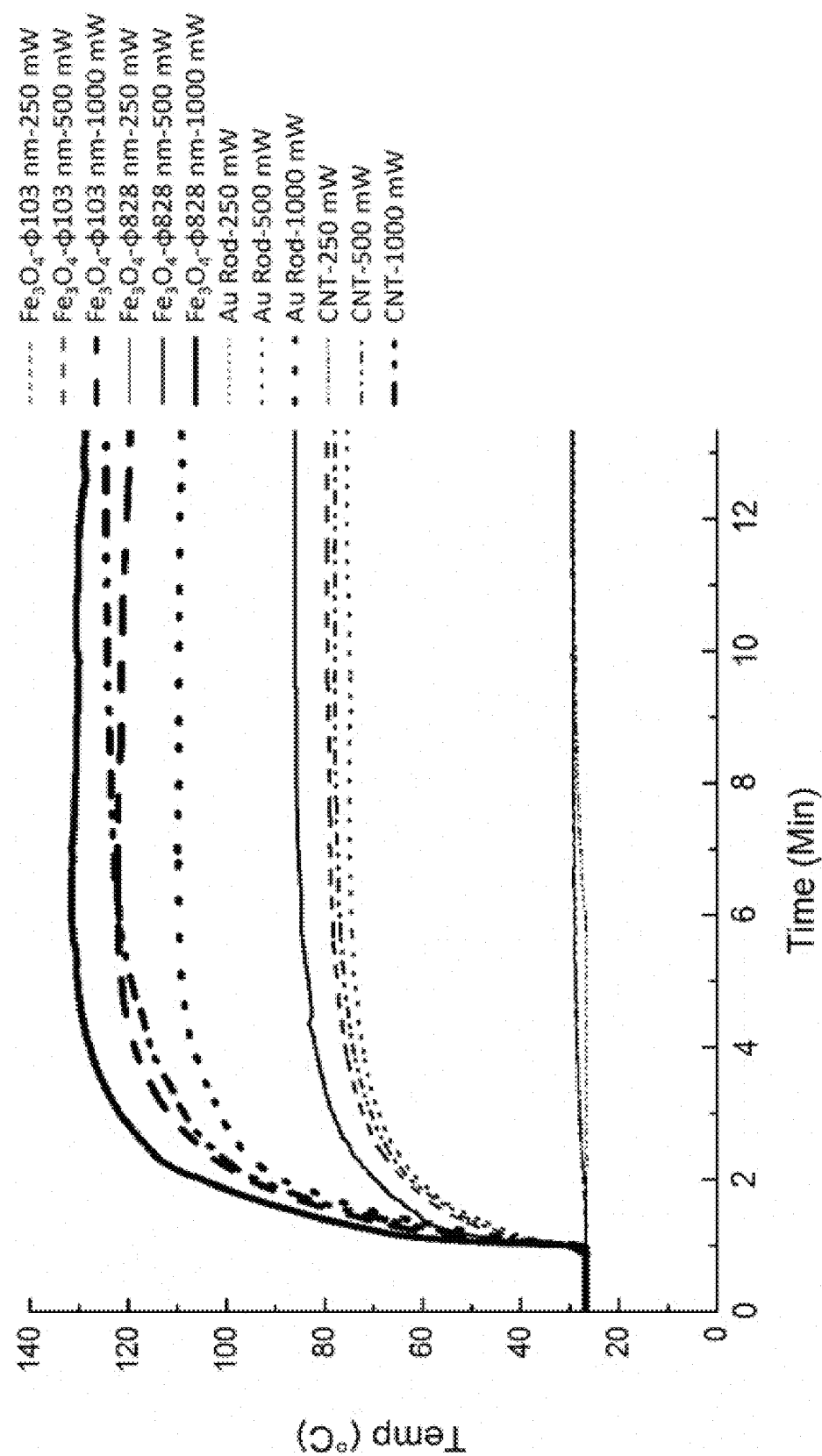
FIG. 5B illustrates the variation in temperature of various types of nanoparticles along with time, in which the concentration of the nanoparticles is 2,500 ppm in accordance with aspects of the present disclosure.

Similar results were observed when the concentration of each type of particles were increased to be 2,500 ppm (see FIG. 5B).

Example 2 PCR Conducted Using the $Fe_3O_4$ Particles of Example 1.1

2.1 PCR Reaction Mixtures Comprising the $Fe_3O_4$ Particles of Example 1.1

Figure 6:
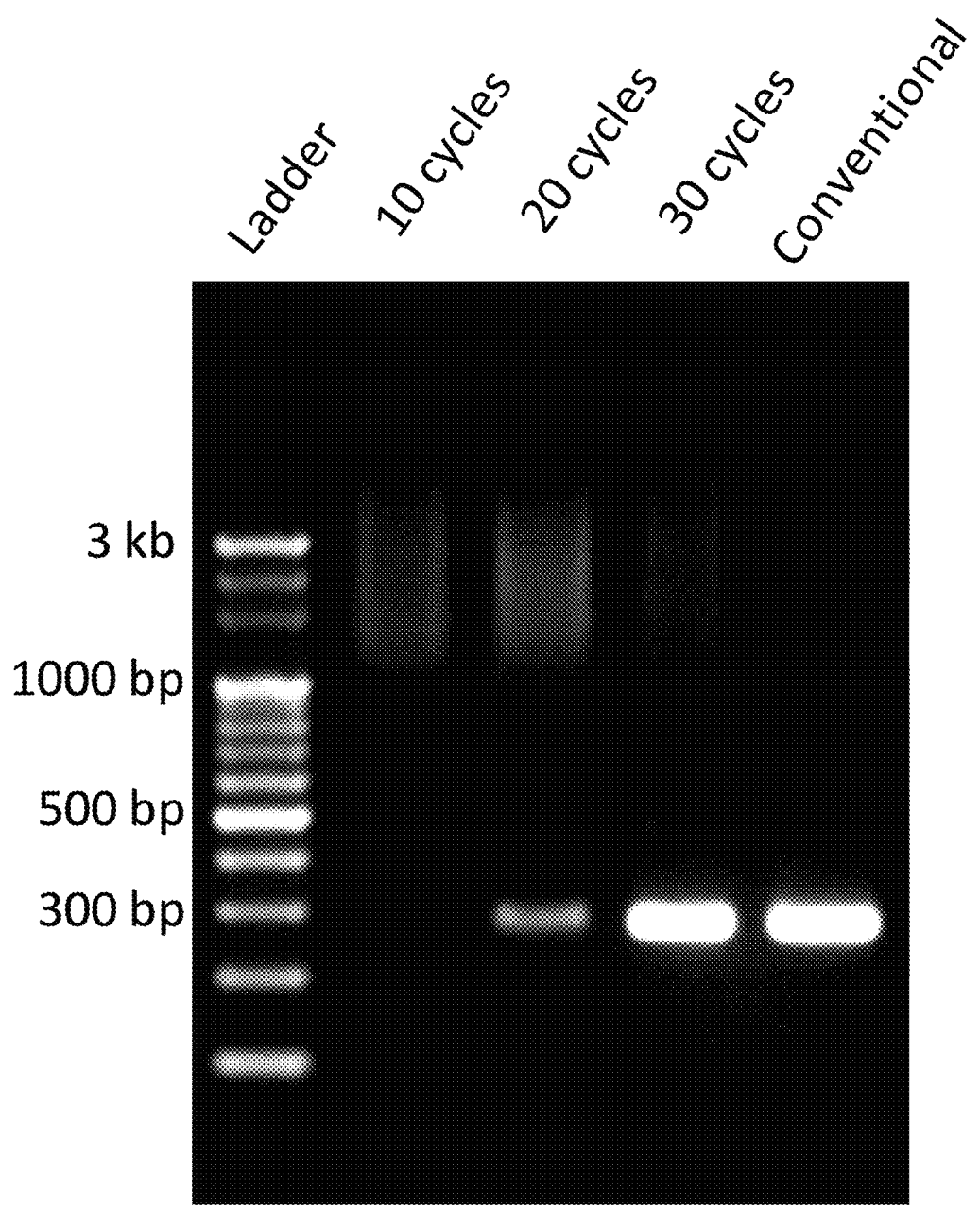
FIG. 6 illustrates the result of a PCR in accordance with aspects of the present disclosure.

In this example, 1000 ppm of the $Fe_3O_4$ particles of example 1.1 were directly mixed with the PCR reaction mixture in a reaction tube, the tube was then subjected to PCR cycles, by (1) irradiating the tube with radiation frequency of 371 THz emitted from a Laser Diode (700 mW) until the temperature reached 95° C., and held (500 mW) for 15 to 30 seconds; (2) activating the fan system to decrease the temperature until it reached 56° C., and held (250 mW) for 15 to 30 seconds; and (c) irradiating the tube again with 371 THz of EMR frequency until the temperature reached 72° C., and held for 15 to 30 seconds. The PCR cycles were repeated 30 times, and the amplified product was detected by electrophoresis (FIG. 6, Lane 4). A 100 bp YEA Ladder DNA Marker II (Yeastern Biotech Co., Ltd., Cat. No. FYD009-1ML) was used as a reference (FIG. 6, Lane 1).

The above procedure was compared to a conventional PCR procedure (FIG. 6, Lane 5). The conventional procedure was performed as follows. First, a reaction mixture containing a DNA sample was heated to 95° C. for 10 minutes for denaturation of the DNA sample. Second, the denaturation was repeated for 30 cycles, each cycles being performed at 95° C. for 30 seconds. Third, hybridization with corresponding DNA primers was performed at 56° C. for 30 seconds. Fourth, the hybridized primers were elongated at 72° C. for 30 seconds. Finally, an additional elongation step was performed 72° C. for 10 minutes to form the final product as shown in Lane 5 of FIG. 6.

2.2 PCR Conducted in a Vessel Made From the $Fe_3O_4$ Particles of Example 1.1

In this example, PCR cycles are performed by placing the PCR reaction mixtures in a vessel made of a material comprising the $Fe_3O_4$ particles of example 1.1. The PCR cycles are then initiated in accordance with the steps described above.

It will be understood that the above description of embodiments is given by way of example only and that various modifications can be made by those with ordinary skill in the art. The above specification, examples and data provide a complete description of the structure and use of exemplary embodiments. Although various embodiments have been described above with a certain degree of particularity, or with reference to one or more individual embodiments, those with ordinary skill in the art could make numerous alterations to the disclosed embodiments without departing from the spirit or scope of this disclosure.

Statements of the Disclosure

Statement 1: A method for amplifying a nucleic acid sequence in a polymerase chain reaction (PCR), the method comprising contacting, in a reaction vessel, a reaction mixture comprising target nucleic acids with particles comprising a transition metal material; and irradiating the particles with electromagnetic radiation (EMR) having a frequency of about 200 kHz to 500 THz.

Statement 2: The method according to Statement 1 wherein the transition metal material comprises a transition metal, a transition metal oxide, a transition metal hydroxide, a Group III metal compound doped with the transition metal or a transition metal ion, a silicon dioxide doped with the transition metal, a silicon dioxide doped with the transition metal oxide, or a silicon dioxide doped with the transition metal hydroxide.

Statement 3: The method according to any one of Statements 1 or 2, wherein the temperature of the reaction mixture in the PCR is increased at a rate of about 13-15° C. per second.

Statement 4: The method according to any one of Statements 1-3, wherein the temperature of the reaction mixture in the PCR is decreased at a rate of about 6-7° C. per second.

Statement 5: The method according to any one of Statements 2-4, wherein the Group III metal compound is any one of a nitride, a phosphide or an arsenide, and the Group III metal is any one of aluminum (Al), gallium (Ga), and indium (In).

Statement 6: The method according to any one of Statements 1-5, wherein the transition metal material comprises a combination of one or more transition metal oxides and transition metal hydroxides.

Statement 7: The method according to any one of Statements 1-6, wherein the transition metal material comprises one or more of FeO, $Fe_2O_3$, $Fe_3O_4$, FeO(OH), $Fe(OH)_2$, $Fe(OH)_3$, MnO, $Mn_3O_4$, $Mn_2O_3$, MnO(OH), $MnO_2$, CoO, CoO(OH), $Co_3O_4$, and CuO.

Statement 8: The method according to any one of Statements 2-6, wherein the transition metal material comprises any one of manganese (Mn), iron (Fe), cobalt (Co), and copper (Cu).

Statement 9: The method according to any one of Statements 1-8, wherein at least one of the particles has a hydrodynamic diameter of about 10 to 1,200 nm.

Statement 10: The method according to any one of Statements 1-8, wherein at least one of the particles has a hydrodynamic diameter of about 200 to 1,200 nm.

Statement 11: The method according to any one of Statements 1-8, wherein at least one of the particles has a hydrodynamic diameter of about 60 to 150 nm.

Statement 12: The method according to any one of Statements 1-11, wherein irradiating the particles comprises increasing the temperature of the reaction mixture to a first temperature range of about 80 to 105° C. for about 0.5 to 1 minute, to denature the target DNA; increasing the temperature of the reaction mixture to a second temperature range of about 35 to 65° C. for about 0.5 to 1 minute to hybridize with the denatured target nucleic acid sequence a pair of primers; and increasing the temperature of the reaction mixture to a third temperature range of about 40 to 80° C., for about 0.5 to 5 minutes, to amplify the target nucleic acid sequence by elongation synthesis.

Statement 13: An apparatus for amplifying a nucleic acid sequence in a polymerase chain reaction (PCR), the apparatus comprising: a microprocessor configured to communicatively couple with a user input device and receive instructions from the user input device and implement the received instructions; a reaction vessel, communicatively coupled with the microprocessor, to house the nucleic acid sequence, reagents for the PCR, and particles; a temperature sensor communicatively coupled with the reaction vessel and the microprocessor; and an electromagnetic radiation (EMR) generator, communicatively coupled with the microprocessor and configured to direct the EMR toward the reaction vessel, wherein the particles comprise a transition metal material.

Statement 14: The apparatus according to Statement 13, wherein the EMR generator is configured to generate EMR at frequencies ranging from 100 THz to 600 THz.

Statement 15: The apparatus according to Statement 13, wherein the EMR generator is configured to generate EMR at frequencies ranging from 300 THz to 400 THz.

Statement 16: The apparatus according to Statement 13, wherein the EMR generator is configured to generate EMR at frequencies ranging from 1 MHz to 2 MHz.

Statement 17: The apparatus according to any one of Statements 13-16, further comprising a temperature control circuit for controlling the temperature sensor of the reaction housing; and a heat control circuit for modulating the intensity of the EMR frequency generated from the EMR frequency generator, wherein the microprocessor is coupled with the temperature control circuit and the heat control circuit.

Statement 18: The apparatus according to Statement 17, wherein the microprocessor is configured to increase the temperature of the reaction mixture to a first temperature range of about 80 to 105° C., for about 0.5 to 1 minute, to denature the target DNA; increase the temperature of the reaction mixture to a second temperature range of about 35 to 65° C. for about 0.5 to 1 minute to hybridize with the denatured target nucleic acid sequence a pair of primers; and increase the temperature of the reaction mixture to a third temperature range of about 40 to 80° C., for about 0.5 to 5 minutes, to amplify the target nucleic acid sequence by elongation synthesis.

Statement 19: The apparatus according to any one of Statements 13-18, further comprising a wireless communication circuit for wireless communication with the user input device.

Statement 20: The apparatus according to any one of Statements 13-19, wherein the transition metal material comprises a transition metal, a transition metal oxide, a transition metal hydroxide, a Group III metal compound doped with the transition metal or a transition metal ion, a silicon dioxide doped with the transition metal, a silicon dioxide doped with the transition metal oxide, or a silicon dioxide doped with the transition metal hydroxide.

Statement 21: The apparatus according to any one of Statements 13-20 wherein transition metal material comprises one or more of FeO, $Fe_2O_3$, $Fe_3O_4$, FeO(OH), $Fe(OH)_2$, $Fe(OH)_3$, MnO, $Mn_3O_4$, $Mn_2O_3$, MnO(OH), $MnO_2$, CoO, CoO(OH), $Co_3O_4$, and CuO.

Statement 22: The apparatus according to Statement 20, wherein the Group III metal compound is any one of a nitride, a phosphide or an arsenide, and the Group III metal is any one of aluminum (Al), gallium (Gal, and indium (In).

Statement 23: The apparatus according to any one of Statements 13-22, wherein the transition metal material comprises a combination of one or more transition metal oxides and transition metal hydroxides.

Statement 24: The apparatus according to any one of Statements 13-23, wherein the transition metal material comprises any one of manganese (Mn), iron (Fe), cobalt (Co), and copper (Cu).

Statement 25: The apparatus according to any one of Statements 13-24, wherein at least one of the particles has a hydrodynamic diameter of about 10 to 1,200 nm.

Statement 26: The apparatus according to any one of Statements 13-24, wherein at least one of the particles has a hydrodynamic diameter of about 200 to 1,200 nm.

Statement 27: The apparatus according to any one of Statements 13-24, wherein at least one of the particles has a hydrodynamic diameter of about 60 to 150 nm.

Statement 28: The apparatus according to any one of Statements 13-27, wherein the user input device is one of a mobile phone, a laptop computer, and a tablet computer.

Statement 29: The apparatus according to any one of Statements 13-28, wherein the apparatus is no more than 500 cm$^3$ in volume.

Statement 30: A polymerase chain reaction (PCR) vessel, the vessel comprising one or more films, coatings, or layers of nanoparticles comprising a transition metal material on a surface of the vessel.

Statement 31: The vessel according to Statement 30, wherein the transition metal material comprises a transition metal, a transition metal oxide, a transition metal hydroxide, a Group III metal compound doped with the transition metal or a transition metal ion, a silicon dioxide doped with the transition metal, a silicon dioxide doped with the transition metal oxide, or a silicon dioxide doped with the transition metal hydroxide.

Statement 32: The vessel according to any one of Statements 30-31, wherein transition metal material comprises one or more of FeO, $Fe_2O_3$, $Fe_3O_4$, FeO(OH), $Fe(OH)_2$, $Fe(OH)_3$, MnO, $Mn_3O_4$, $Mn_2O_3$, MnO(OH), $MnO_2$, CoO, CoO(OH), $Co_3O_4$, and CuO.

Statement 33: The vessel according to Statement 31, wherein the Group III metal compound is any one of a nitride, a phosphide or an arsenide, and the Group III metal is any one of aluminum (Al), (Ga), and indium (In).

Statement 34: The vessel according to any one of Statements 30-33, wherein the transition metal material comprises any one of manganese (Mn), iron (Fe), cobalt (Co), and copper (Cu).

Statement 35: The vessel according to any one of Statements 30-35, wherein the nanoparticles comprise a combination one or more transition metal oxides and transition metal hydroxides.

Statement 36: The vessel according to any one of Statements 30-35, wherein at least one of the particles has a hydrodynamic diameter of about 10 to 1,200 nm.

Statement 37: The vessel according to any one of Statements 30-35, wherein at least one of the particles has a hydrodynamic diameter of about 200 to 1,200 nm.

Statement 38: The vessel according to any one of Statements 30-35, wherein at least one of the particles has a hydrodynamic diameter of about 60 to 150 nm.

Statement 43: A microfluidic biochip, wherein the microfluidic biochip comprises a vessel according to any one of statements 30-38.

Statement 44: Nanoparticles for generating heat after irradiated by electromagnetic radiation (EMR) at frequencies ranging from about 300 to 400 THz in a PCR apparatus, the nanoparticles have a hydrodynamic diameter of about 50 to 200 nm, wherein the nanoparticles comprise a transition metal oxide or a transition metal hydroxide.

The foregoing descriptions of specific compositions and methods of the present disclosure have been presented for purposes of illustration and description. They are not intended to be exhaustive or to limit the disclosure to the precise compositions and methods disclosed and obviously many modifications and variations are possible in light of the above teaching. The examples were chosen and described in order to best explain the principles of the disclosure and its practical application, to thereby enable others skilled in the art to best utilize the disclosure with various modifications as are suited to the particular use contemplated. It is intended that the scope of the disclosure be defined by the claims appended hereto and their equivalents.

What is claimed is:

1. An apparatus for amplifying a nucleic acid sequence in a polymerase chain reaction (PCR), the apparatus comprising:
    a microprocessor communicatively coupled to a user input device and configured to receive instructions from the user input device and implement the received instructions;
    an electromagnetic radiation (EMR) generator communicatively coupled to the microprocessor and configured to generate EMR at frequencies ranging from 300 THz to 400 THz;
    a reaction vessel communicatively coupled to the microprocessor, configured to receive EMR from the EMR generator and to house the nucleic acid sequence;
    at least one transition metal particle disposed in the reaction vessel accessible to the nucleic acid sequence, wherein a material of the transition metal particle includes $Fe_3O_4$ without Au coating; and
    a temperature sensor communicatively coupled to the reaction vessel and the microprocessor.

2. The apparatus of claim 1, further comprising:
    a temperature control circuit for controlling the temperature sensor; and
    a heat control circuit for modulating the intensity of EMR from the EMR frequency generator,
    wherein the microprocessor is coupled to the temperature control circuit and the heat control circuit.

3. The apparatus of claim 2, wherein the microprocessor is configured to:
    cause the temperature of the reaction mixture to a first temperature range of about 80 to 105° C., for about 0.5 to 1 minute;
    cause the temperature of the reaction mixture to a second temperature range of about 35 to 65° C., for about 0.5 to 1 minute; and
    cause the temperature of the reaction mixture to a third temperature range of about 40 to 80° C., for about 0.5 to 5 minutes.

4. The apparatus of claim 1, further comprising a wireless communication circuit for wireless communication with the user input device.

5. The apparatus of claim 1, wherein at least one of the transition metal particles has a hydrodynamic diameter of about 10 to 1,200 nm.

6. The apparatus of claim 1, wherein at least one of the transition metal particles has a hydrodynamic diameter of about 200 to 1,200 nm.

7. The apparatus of claim 1, wherein at least one of the transition metal particles has a hydrodynamic diameter of about 60 to 150 nm.

8. The apparatus of claim 1, wherein the user input device is one of a mobile phone, a laptop computer, and a tablet computer.

9. The apparatus of claim 1, wherein the apparatus is no more than 500 cm$^3$ in volume.

* * * * *